United States Patent Office 3,076,450
Patented Feb. 5, 1963

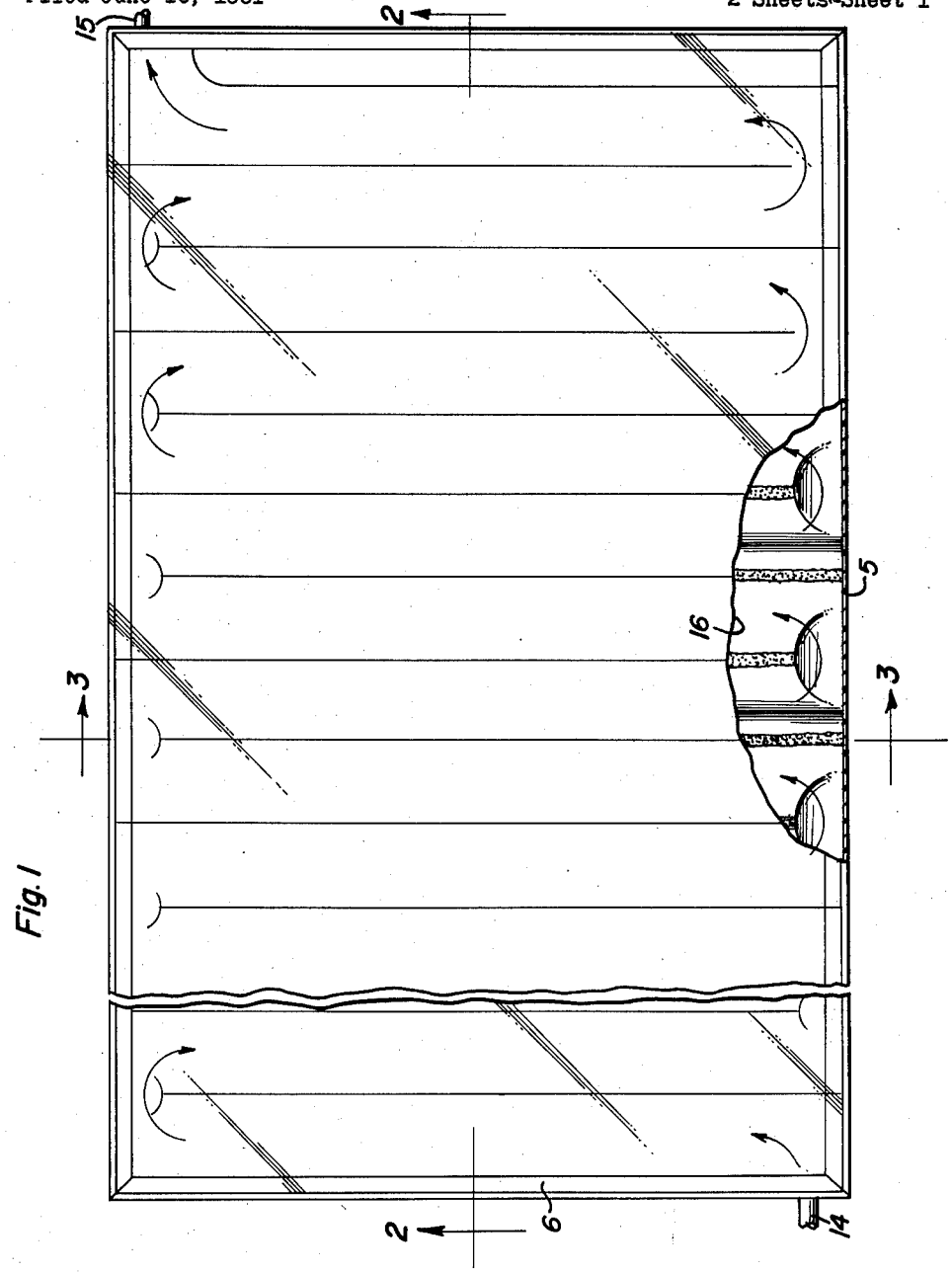
Edward W. Gough
Paul D. Irwin   INVENTORS.

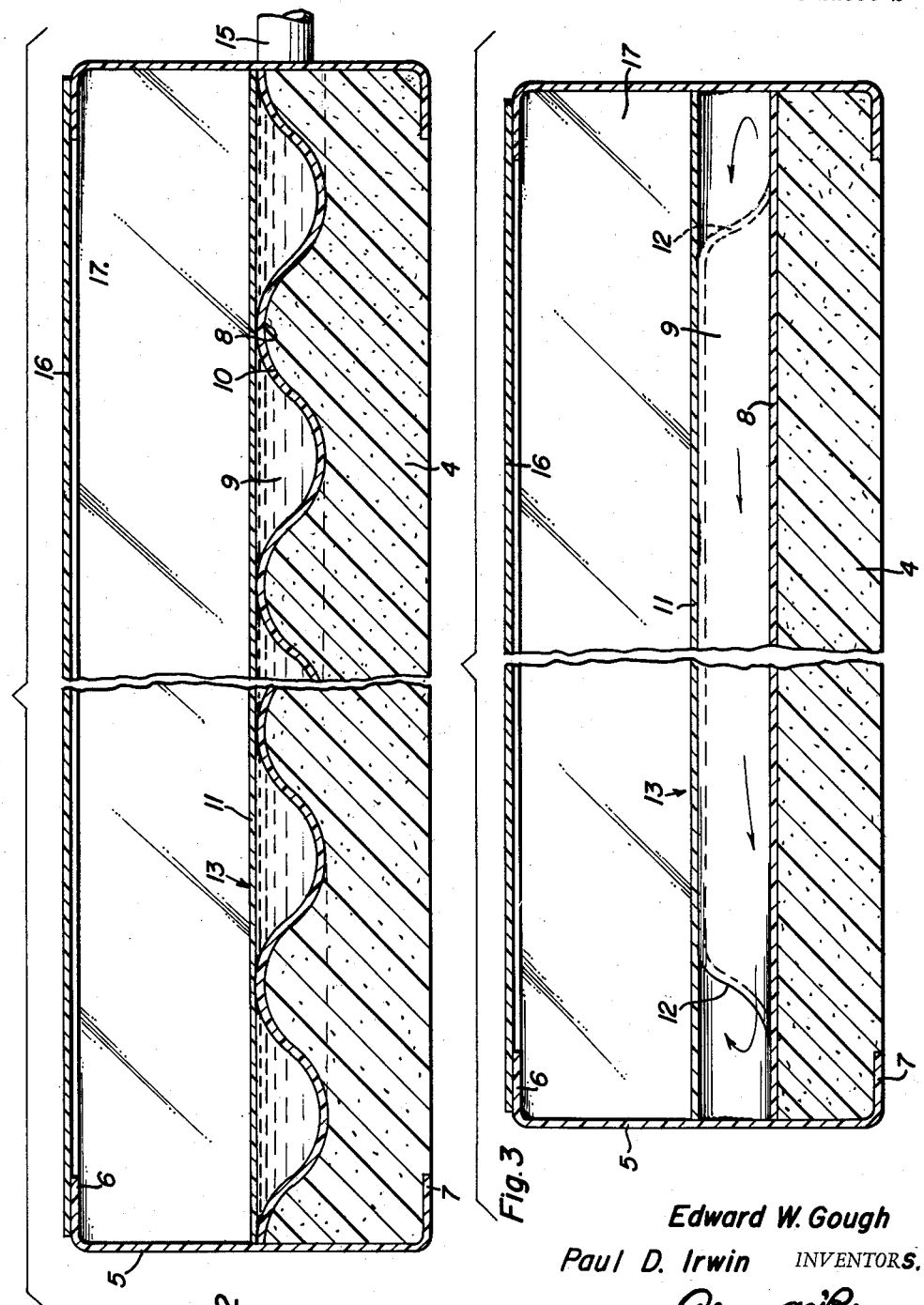

3,076,450
PLASTIC SOLAR HEATER
Edward W. Gough, 4911 Farber Ave., Covina, Calif., and Paul D. Irwin, 2300 Brigden Road, Pasadena, Calif.
Filed June 16, 1961, Ser. No. 117,535
2 Claims. (Cl. 126—271)

This invention relates to new and useful improvements in solar heaters to be used particularly, although by no means necessarily, for heating water for residences, swimming pools, etc.

Present solar heaters are inefficient for a number of reasons. The design is such that the heat must transfer over a considerable distance through metal to a copper tube containing water. Each time the heat transfers from one medium to another there is a loss in efficiency. The metal is usually coated with black paint which in itself is a poor conductor of heat, even though its absorption of solar energy may be excellent, depending on several factors, such as density, gloss, etc.

Because of the fact that the metal itself must transfer the heat, there is a tendency for the water passing through the tubes to release lime deposits as it picks up heat, further lowering efficiency. Also, because the chemicals used in swimming pools are corrosive, the copper tubing soon acquires an insulating deposit of lime and corrosive elements, which deposit is difficult to remove and which still further reduces efficiency.

The volume of water available as a heat absorbing medium is limited by the size and amount of tubing per square foot. Since it is economically unfeasible to lay the tubing side by side over the surface of the heat exchanger, a thin, flat copper sheet to which the tubing is soldered us used. The tubing is kept to a minimum size because of economic and weight considerations.

As a result of the foregoing factors, the present methods employed to heat water through the use of solar energy have not achieved a practical degree of efficiency. Furthermore, because of the choice limitations of material, present solar heaters are unsightly and consequently have limited application. Accordingly, the primary object of the present invention is to provide, in a manner as hereinafter set forth, a greatly improved solar water heater which is made entirely of plastics whereby the aforementioned and other deficiencies in present solar heaters will be substantially eliminated.

Another important object of this invention is to provide an all-plastic solar heater of the aforementioned character which is fabricated in a novel manner to define what may be considered a flat coil or the like through which the water to be heated circulates.

Other objects of the invention are to provide an improved all-plastic solar water heater of the character set forth which will be comparatively simple in construction, strong, durable, compact, of light weight, highly efficient and reliable in use, attractive in appearance and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in front elevation of a solar water heater constructed in accordance with the present invention, a portion of the device being broken away in section;

FIGURE 2 is a view in vertical longitudinal section on an enlarged scale through the device, taken substantially on the line 2—2 of FIGURE 1; and FIGURE 3 is a view in transverse section on an enlarged scale through the device, taken substantially on the line 3—3 of FIGURE 1.

Referring now to the drawings in detail, it will be seen that the embodiment of the invention which has been illustrated comprises a polyurethane foam plastic, heat insulative base, slab or bottom 4 of suitable dimensions, said base being substantially rectangular. The base 4 is mounted in the lower or rear portion of a rectangular molded plastic frame 5 comprising, in the embodiment illustrated, inturned marginal flanges 6 and 7.

The base 4 includes a corrugated or undulated top portion 8 defining a series of parallel water ducts or channels 9. The corrugated or undulated top 8 of the base 4 is provided with a black plastic liner 10. Sealed on the crests of the corrugations or the undulations of the liner 10 is a transparent plastic panel 11. The ducts 9 defined by the construction and arrangement described communicate at alternate ends, as at 12. Thus, what may be considered a flat coil is provided through which the water to be heated circulates. This coil is designated generally by reference numeral 13. Inlet and outlet pipe connections 14 and 15, respectively, communicate with the coil 13 at the ends thereof. Mounted on the top or front of the frame 5 is a panel or cover 16, also of a suitable transparent plastic. The cover 16 is sealed on the flange 6 of the frame 5 and provides a dead air space 17 above the coil 13.

It is thought that the operation of the heater will be readily apparent from a consideration of the foregoing. Briefly, the water enters the device at 14 and flows through the continuous duct or channel provided by the passages 9 and 12. Of course, the water is heated in an obvious manner as it flows through the device and is discharged therefrom at 15. The cover 16 and the panel 11 are of a transparent plastic having excellent solar heat transmitting characteristics. The black plastic liner 10 absorbs heat and thus materially promotes the efficiency of the device. The efficiency is further increased by the insulating characteristic of the plastic base 4. The solar heat energy passes through the transparent cover 16 and the panel 11 and impinges on the black plastic liner 10 where it is taken off by the water flowing through the device, resulting in a direct heat transfer.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A solar heater comprising a rectangular plastic frame including integral, inturned upper and lower flanges, a molded, resilient plastic, heat insulative corrugated base in the frame on the lower flange, said frame closing the ends of the corrugations, a transparent plastic panel bridging the corrugations and sealingly affixed to the crests thereof and defining, in conjunction therewith, a plurality of parallel water ducts, means providing communication between the ducts at alternating opposite ends, a black plastic liner affixed to the base below the panel and conforming to the corrugations of said base, and a transparent plastic cover affixed to the upper flange in spaced, opposed relation to the panel and providing a dead air space in conjunction therewith.

2. A solar heater in accordance with claim 1, said base including a single sheet of material of a substantial thickness and having a flat underside, said means being formed by the opposite ends of the corrugations alternately terminating short of the frame for defining water passages between the ducts.

References Cited in the file of this patent

UNITED STATES PATENTS

| | | |
|---|---|---|
| 1,889,238 | Clark | Nov. 29, 1932 |
| 2,608,968 | Moseley | Sept. 2, 1952 |
| 2,705,948 | Rostock | Apr. 12, 1955 |
| 2,907,318 | Awot | Oct. 6, 1959 |

FOREIGN PATENTS

| | | |
|---|---|---|
| 28,130 | Great Britain | 1907 |
| 840,926 | France | Jan. 28, 1939 |
| 822,768 | Great Britain | Oct. 28, 1959 |